United States Patent
Kiribayashi (10) Patent No.: US 8,077,674 B2
(45) Date of Patent: Dec. 13, 2011

(54) MOBILE WIRELESS COMMUNICATION SYSTEM AND METHOD OF CARRYING OUT HANDOVER IN THE SYSTEM

(75) Inventor: Shinji Kiribayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 555 days.

(21) Appl. No.: 12/300,147

(22) PCT Filed: Apr. 26, 2007

(86) PCT No.: PCT/JP2007/059070
§ 371 (c)(1), (2), (4) Date: Nov. 10, 2008

(87) PCT Pub. No.: WO2007/129595
PCT Pub. Date: Nov. 15, 2007

(65) Prior Publication Data
US 2010/0238897 A1    Sep. 23, 2010

(30) Foreign Application Priority Data
May 9, 2006  (JP) .................................. 2006-130900

(51) Int. Cl.
*H04W 4/00* (2009.01)
*H04W 36/00* (2009.01)
*H04J 3/16* (2006.01)
(52) U.S. Cl. .................. 370/331; 370/465; 455/437
(58) Field of Classification Search ............... None
See application file for complete search history.

(56) References Cited

U.S. PATENT DOCUMENTS

| | | | |
|---|---|---|---|
| 7,502,593 B2 * | 3/2009 | Shinoi | 455/67.11 |
| 2005/0107110 A1 * | 5/2005 | Vasudevan et al. | 455/525 |
| 2006/0223445 A1 * | 10/2006 | Baker et al. | 455/69 |
| 2008/0137562 A1 * | 6/2008 | Li et al. | 370/280 |

FOREIGN PATENT DOCUMENTS

| | | |
|---|---|---|
| JP | 2004260589 A | 9/2004 |
| JP | 2005509327 A | 4/2005 |
| JP | 2006-020270 A | 1/2006 |
| WO | 2006011567 A1 | 2/2006 |

OTHER PUBLICATIONS

International Search Report for PCT/JP2007/059070 mailed Jul. 10, 2007.

* cited by examiner

*Primary Examiner* — Nittaya Juntima (57) ABSTRACT

When a strength of an electric field for receiving wireless in downlink is equal to or smaller than a predetermined strength, the mobile communication terminal device 105 transmits a retrieval request to the retrieval server 102 through the first wireless station 103 to cause the retrieval server to start selecting a new wireless station, changes at least one of profiles (UTP) for transmitting wireless in uplink, and notifies the first wireless station 103 of the changed profile(s). The first wireless station 103 changes a profile or profiles (URP) for receiving wireless in uplink, corresponding to the changed profile(s) (UTP) for transmitting wireless in uplink, received from the mobile wireless terminal device, changes at least one of profiles (DTP) for transmitting wireless in downlink, and notifies the mobile wireless terminal device of the changed profile(s) (DTP) for transmitting wireless in downlink.

43 Claims, 6 Drawing Sheets

MOBILE WIRELESS COMMUNICATION SYSTEM AND METHOD OF CARRYING OUT HANDOVER IN THE SYSTEM

BACKGROUND OF THE INVENTION

1. Field of the Invention

The invention relates to handover technique in a mobile wireless communication network. In particular, the invention relates to a mobile wireless communication system, a method of carrying out handover in the system, a wireless station used in the system, a mobile communication terminal device used in the system, a program for causing the wireless station to carry out the method, and a program for causing the mobile communication terminal device to carry out the method.

2. Description of the Related Art

Many attempts have been made with respect to handover between adjacent wireless stations.

For instance, one of examples is disclosed in Japanese Patent Application Publication No. 2005-509327.

It is supposed that a mobile communication terminal device is making wireless communication with a first base station, and is moving in a direction from the first base station towards a second base station disposed adjacent to the first base station. If the mobile communication terminal device detects reduction in a strength of an electric field for receiving signals from the first base station, increase in power for transmitting signals, or increase in a signal-interference ratio (SIR) in the second base station, the mobile communication terminal device treats them as triggers for starting carrying out handover to the second base station from the first base station.

DISCLOSURE OF THE INVENTION

Recently, there has been suggested a mobile communication terminal device including a plurality of wireless interfaces different from one another with respect to a communication system.

For instance, if a mobile communication terminal device including a WLAN wireless interface and a W-CDMA wireless interface, during making wireless communication in accordance with WLAN, could not maintain making the communication, the mobile communication terminal device switches a communication system from WLAN to W-CDMA to thereby restart making wireless communication.

However, since it takes time to restart the communication by switching a communication system, serviceability to a user is much deteriorated in real-time service such as voice communication or visual telephone communication.

In comparison with the conventional cellular system, a bandwidth is not ensured for each user in WLAN system in which packet communication is basically carried out. Accordingly, even if wireless quality were high, communication might be much delayed, voices might be interrupted, or voices might be delayed, resulting in much deterioration in serviceability to users.

Accordingly, if only a strength of an electric field for receiving wireless signals is used as a factor in accordance with which whether handover should be carried out is determined, only signal-receiving quality would be considered. This means that a strength of an electric field for receiving wireless signals is not sufficient for measuring communication quality in wireless communication.

For instance, if a strength of an electric field for receiving wireless signals were high, but the communication in the area were very crowded, it would be substantially impossible to provide sufficient real-time service (voice communication and visual communication) to users.

Furthermore, even if a strength of an electric field for receiving wireless signals were sufficiently high, wireless signals sometimes could not reach an access point. Thus, if only a strength of an electric field for receiving wireless signals is used as a timing factor in accordance with which whether handover should be carried out is determined, communication might be instantaneously interrupted.

In addition, even if wireless link between an access point and a mobile communication terminal device were sufficiently qualified, a network between the access point and a mobile communication terminal device with which the first mentioned mobile communication terminal device is going to make communication might be crowded, resulting in that a user cannot receive sufficient real-time service.

Furthermore, power for transmitting wireless signals is weak in a wireless communication system in which an administrator is not necessary to have a license to make wireless communication, such as WLAN, an area in which wireless signals can reach is not so wide. Thus, it is difficult to maintain communication quality high around an area in which wireless signals can reach.

Moreover, since internal interferences occur in a mobile communication terminal device including a plurality of wireless interfaces different from one another with respect to a communication system, it sometimes takes much time to retrieve a wireless station to which handover is directed.

SUMMARY OF THE INVENTION

In view of the above-mentioned problems in the conventional mobile wireless communication system, it is an object of the present invention to provide a mobile wireless communication system, a method of carrying out handover in the system, a wireless station used in the system, a mobile communication terminal device used in the system, a program for causing the wireless station to carry out the method, and a program for causing the mobile communication terminal device to carry out the method, all of which are capable of carrying out handover without interruption or with no interruption in communication.

Solution to the Problems

In order to achieve the above-mentioned object, the present invention provides a mobile wireless communication system including a network, a retrieval server connected in wireless communication to the network, a plurality of wireless stations connected in wireless communication to the network, and a mobile communication terminal device making communication, keeping a first wireless link comprising a pair of uplink and downlink with one of the wireless stations, wherein when a strength of an electric field for receiving wireless in the downlink is equal to or smaller than a predetermined strength, the mobile communication terminal device transmits a retrieval request to the retrieval server through a wireless station through which the mobile communication terminal device is making wireless communication, to cause the retrieval server to start selecting a new wireless station, changes at least one of profiles (UTP) for transmitting wireless in the uplink, and notifies the wireless station of the changed profile(s), the wireless station changes a profile or profiles (URP) for receiving wireless in uplink, corresponding to the changed profile(s) (UTP) for transmitting wireless in the uplink, received from the mobile wireless terminal device, changes at least one of profiles (DTP) for transmitting wireless in the downlink, and notifies the mobile wireless terminal device of the changed profile(s) (DTP) for transmitting wireless in the downlink, the mobile communication terminal device, until the mobile communication terminal device establishes a second wireless link with the new wireless station notified from the retrieval server, changes a profile or profiles (DRP) for receiving wireless in downlink, corresponding to the changed profile(s) for transmitting wireless in the downlink, received from the wireless station, to maintain the first wireless link with the wireless station.

The wireless station may be comprised of an access point having a WLAN (Wireless Local Area Network) function, for instance, The mobile communication terminal device changes at least one of profiles (UTP) for transmitting wireless in the uplink, based on a strength of an electric field for receiving wireless, an electric power for transmitting wireless, and an error rate, for instance.

At least one of profiles (UTP) for transmitting wireless in the uplink is modulation, for instance.

At least one of profiles (UTP) for transmitting wireless in the uplink is a coding rate, for instance.

In the case that the first wireless link is established in accordance with OFDMA (Orthogonal Frequency Division Multiple Access), at least one of profiles (UTP) for transmitting wireless in the uplink is a number of sub-channels in the OFDMA, for instance.

It is preferable that the wireless station, on receipt of notification that a profile or profiles for transmitting wireless in the uplink has(have) been changed, from the mobile communication terminal device, changes at least one of profiles (DTP) for transmitting wireless in the downlink, based on a strength of an electric field for receiving wireless, an electric power for transmitting wireless, and an error rate.

At least one of profiles (DTP) for transmitting wireless in the downlink may be modulation, for instance.

At least one of profiles (DTP) for transmitting wireless in the downlink may be a coding rate, for instance.

At least one of profiles (DTP) for transmitting wireless in the downlink may be a number of sub-channels in the OFDMA, for instance.

The mobile communication terminal device may be designed to transmit the retrieval request to the retrieval server through the wireless station when a number of packet collisions exceeds a predetermined threshold.

The mobile communication terminal device may be designed to transmit the retrieval request to the retrieval server through the wireless station when propagation delay of packets exceeds a predetermined threshold.

The mobile communication terminal device may be designed to include a plurality of wireless interfaces different from each other with respect to a communication system, in which case, the mobile communication terminal device may be designed to simultaneously establish a plurality of wireless links with a plurality of wireless stations including the wireless station through which the mobile communication terminal device is making wireless communication, through the plurality of wireless interfaces, detect internal interference among the plurality of wireless interfaces, and cancel the internal interference by changing profiles for operating one of the plurality of wireless interfaces.

The mobile communication terminal device may be comprised of a mobile phone, for instance.

The present invention further provides a method of carrying out handover in a mobile wireless communication system including: a network, a retrieval server connected in wireless communication to the network, a plurality of wireless stations connected in wireless communication to the network, and a mobile communication terminal device making communication, keeping a first wireless link comprising a pair of uplink and downlink with one of the wireless stations, the method including a first step in which, when a strength of an electric field for receiving wireless in the downlink is equal to or smaller than a predetermined strength, the mobile communication terminal device transmits a retrieval request to the retrieval server through a wireless station through which the mobile communication terminal device is making wireless communication, to cause the retrieval server to start selecting a new wireless station, changes at least one of profiles (UTP) for transmitting wireless in the uplink, and notifies the wireless station of the changed profile(s), a second step in which the wireless station changes a profile or profiles (URP) for receiving wireless in uplink, corresponding to the changed profile(s) (UTP) for transmitting wireless in the uplink, received from the mobile wireless terminal device, changes at least one of profiles (DTP) for transmitting wireless in the downlink, and notifies the mobile wireless terminal device of the changed profile(s) (DTP) for transmitting wireless in the downlink, a third step in which the mobile communication terminal device, until the mobile communication terminal device establishes a second wireless link with the new wireless station notified from the retrieval server, changes a profile or profiles (DRP) for receiving wireless in downlink, corresponding to the changed profile(s) (DTP) for transmitting wireless in the downlink, received from the wireless station, to maintain the first wireless link with the wireless station, and a fourth step in which the mobile communication terminal device establishes a second wireless link with the new wireless station notified from the retrieval server.

The wireless station is comprised of an access point having a WLAN (Wireless Local Area Network) function, for instance.

It is preferable that at least one of profiles (UTP) for transmitting wireless in the uplink is changed in the first step, based on a strength of an electric field for receiving wireless, an electric power for transmitting wireless, and an error rate.

For instance, modulation may be selected as at least one of profiles (UTP) for transmitting wireless in the uplink.

For instance, a coding rate may be selected as at least one of profiles (UTP) for transmitting wireless in the uplink.

In the case that the first wireless link is established in accordance with OFDMA (Orthogonal Frequency Division Multiple Access), at least one of profiles (UTP) for transmitting wireless in the uplink may be a number of sub-channels in the OFDMA, for instance.

It is preferable that the wireless station, on receipt of notification that a profile or profiles for transmitting wireless in the uplink has(have) been changed, from the mobile communication terminal device, changes in the second step at least one of profiles (DTP) for transmitting wireless in the downlink, based on a strength of an electric field for receiving wireless, an electric power for transmitting wireless, and an error rate.

For instance, modulation may be selected as at least one of profiles (DTP) for transmitting wireless in the downlink.

For instance, a coding rate may be selected as at least one of profiles (DTP) for transmitting wireless in the downlink.

For instance, a number of sub-channels in the OFDMA may be selected as at least one of profiles (DTP) for transmitting wireless in the downlink.

It is preferable that the mobile communication terminal device transmits the retrieval request to the retrieval server through the wireless station in the first step when a number of packet collisions exceeds a predetermined threshold.

It is preferable that the mobile communication terminal device transmits the retrieval request to the retrieval server through the wireless station in the first step when propagation delay of packets exceeds a predetermined threshold.

The mobile communication terminal device may be designed to include a plurality of wireless interfaces different from each other with respect to a communication system, in which case, it is preferable that the method further includes a step in which the mobile communication terminal device simultaneously establishes a plurality of wireless links with a plurality of wireless stations including the wireless station through which the mobile communication terminal device is making wireless communication, through the plurality of wireless interfaces, detects internal interference among the plurality of wireless interfaces, and cancels the internal interference by changing profiles for operating one of the plurality of wireless interfaces.

The present invention further provides a wireless station to be used in a mobile wireless communication system including: a network, a retrieval server connected in wireless communication to the network, a plurality of wireless stations connected in wireless communication to the network, and a mobile communication terminal device making communication, keeping a first wireless link comprising a pair of uplink and downlink with one of the wireless stations, wherein, in the case that, when a strength of an electric field for receiving wireless in the downlink is equal to or smaller than a predetermined strength, the mobile communication terminal device transmits a retrieval request to the retrieval server through a wireless station through which the mobile communication terminal device is making wireless communication, to cause the retrieval server to start selecting a new wireless station, changes at least one of profiles (UTP) for transmitting wireless in the uplink, and notifies the wireless station of the changed profile(s), the wireless station changes a profile or profiles (URP) for receiving wireless in uplink, corresponding to the changed profile(s) (UTP) for transmitting wireless in the uplink, received from the mobile wireless terminal device, changes at least one of profiles (DTP) for transmitting wireless in the downlink, and notifies the mobile wireless terminal device of the changed profile(s) (DTP) for transmitting wireless in the downlink.

The wireless station is comprised of an access point having a WLAN (Wireless Local Area Network) function, for instance.

It is preferable that the mobile communication terminal device, on receipt of notification that a profile or profiles for transmitting wireless in the uplink has(have) been changed, from the mobile communication terminal device, changes at least one of profiles (UTP) for transmitting wireless in the uplink, based on a strength of an electric field for receiving wireless, an electric power for transmitting wireless, and an error rate.

For instance, modulation may be selected as at least one of profiles (UTP) for transmitting wireless in the uplink.

For instance, a coding rate may be selected as at least one of profiles (UTP) for transmitting wireless in the uplink.

For instance, a number of sub-channels in the OFDMA may be selected as at least one of profiles (UTP) for transmitting wireless in the uplink.

The present invention further provides a mobile communication terminal device in a mobile wireless communication system including: a network, a retrieval server connected in wireless communication to the network, a plurality of wireless stations connected in wireless communication to the network, and the mobile communication terminal device, the mobile communication terminal device making communication, keeping a first wireless link comprising a pair of uplink and downlink with one of the wireless stations, wherein when a strength of an electric field for receiving wireless in the downlink is equal to or smaller than a predetermined strength, the mobile communication terminal device transmits a retrieval request to the retrieval server through a wireless station through which the mobile communication terminal device is making wireless communication, to cause the retrieval server to start selecting a new wireless station, changes at least one of profiles (UTP) for transmitting wireless in the uplink, and notifies the wireless station of the changed profile(s), when the wireless station changes a profile or profiles (URP) for receiving wireless in uplink, corresponding to the changed profile(s) (UTP) for transmitting wireless in the uplink, received from the mobile wireless terminal device, changes at least one of profiles (DTP) for transmitting wireless in the downlink, and notifies the mobile wireless terminal device of the changed profile(s) (DTP) for transmitting wireless in the downlink, the mobile communication terminal device, until the mobile communication terminal device establishes a second wireless link with the new wireless station notified from the retrieval server, changes a profile or profiles (DRP) for receiving wireless in downlink, corresponding to the changed profile(s) for transmitting wireless in the downlink, received from the wireless station, to maintain the first wireless link with the wireless station.

It is preferable that the mobile communication terminal device changes at least one of profiles (UTP) for transmitting wireless in the uplink, based on a strength of an electric field for receiving wireless, an electric power for transmitting wireless, and an error rate.

There may be selected modulation as at least one of profiles (UTP) for transmitting wireless in the uplink.

There may be selected a coding rate as at least one of profiles (UTP) for transmitting wireless in the uplink, for instance.

It is preferable that the mobile communication terminal device transmits the retrieval request to the retrieval server through the wireless station when a number of packet collisions exceeds a predetermined threshold.

It is preferable that the mobile communication terminal device transmits the retrieval request to the retrieval server through the wireless station when propagation delay of packets exceeds a predetermined threshold.

The mobile communication terminal device may be designed to include a plurality of wireless interfaces different from each other with respect to a communication system, in which case, it is preferable that the mobile communication terminal device simultaneously establishes a plurality of wireless links with a plurality of wireless stations including the wireless station through which the mobile communication terminal device is making wireless communication, through the plurality of wireless interfaces, detects internal interference among the plurality of wireless interfaces, and cancels the internal interference by changing profiles for operating one of the plurality of wireless interfaces.

The mobile communication terminal device may be comprised of a mobile phone, for instance.

The present invention further provides a program for causing a computer mounted in a wireless station to carry out a method of carrying out handover in a mobile wireless communication system including: a network, a retrieval server connected in wireless communication to the network, a plurality of wireless stations connected in wireless communication to the network, and a mobile communication terminal device making communication, keeping a first wireless link comprising a pair of uplink and downlink with one of the wireless stations, wherein steps executed by the computer in accordance with the program includes a step in which in the case that, when a strength of an electric field for receiving wireless in the downlink is equal to or smaller than a predetermined strength, the mobile communication terminal device transmits a retrieval request to the retrieval server through a wireless station through which the mobile communication terminal device is making wireless communication, to cause the retrieval server to start selecting a new wireless station, changes at least one of profiles (UTP) for transmitting wireless in the uplink, and notifies the wireless station of the changed profile(s), the wireless station changes a profile or profiles (URP) for receiving wireless in uplink, corresponding to the changed profile(s) (UTP) for transmitting wireless in the uplink, received from the mobile wireless terminal device, changes at least one of profiles (DTP) for transmitting wireless in the downlink, and notifies the mobile wireless terminal device of the changed profile(s) (DTP) for transmitting wireless in the downlink.

The present invention further provides a program for causing a computer mounted in a mobile communication terminal device to carry out a method of carrying out handover in a mobile wireless communication system including: a network, a retrieval server connected in wireless communication to the network, a plurality of wireless stations connected in wireless communication to the network, and a mobile communication terminal device making communication, keeping a first wireless link comprising a pair of uplink and downlink with one of the wireless stations, wherein steps executed by the computer in accordance with the program includes a first step in which in the case that, when a strength of an electric field for receiving wireless in the downlink is equal to or smaller than a predetermined strength, the mobile communication terminal device transmits a retrieval request to the retrieval server through a wireless station through which the mobile communication terminal device is making wireless communication, to cause the retrieval server to start selecting a new wireless station, changes at least one of profiles (UTP) for transmitting wireless in the uplink, and notifies the wireless station of the changed profile(s), a second step in which when the wireless station changes a profile or profiles (URP) for receiving wireless in uplink, corresponding to the changed profile(s) (UTP) for transmitting wireless in the uplink, received from the mobile wireless terminal device, changes at least one of profiles (DTP) for transmitting wireless in the downlink, and notifies the mobile wireless terminal device of the changed profile(s) (DTP) for transmitting wireless in the downlink, the mobile communication terminal device changes a profile or profiles (DRP) for receiving wireless in downlink, corresponding to the changed profile(s) (DTP) for transmitting wireless in the downlink, received from the wireless station, to maintain the first wireless link with the wireless station, and a third step in which the mobile communication terminal device establishes a second wireless link with the new wireless station notified from the retrieval server.

The above and other objects and advantageous features of the present invention will be made apparent from the following description made with reference to the accompanying drawings, in which like reference characters designate the same or similar parts throughout the drawings.

DESCRIPTION OF THE EXEMPLARY EMBODIMENTS

Figure 1:
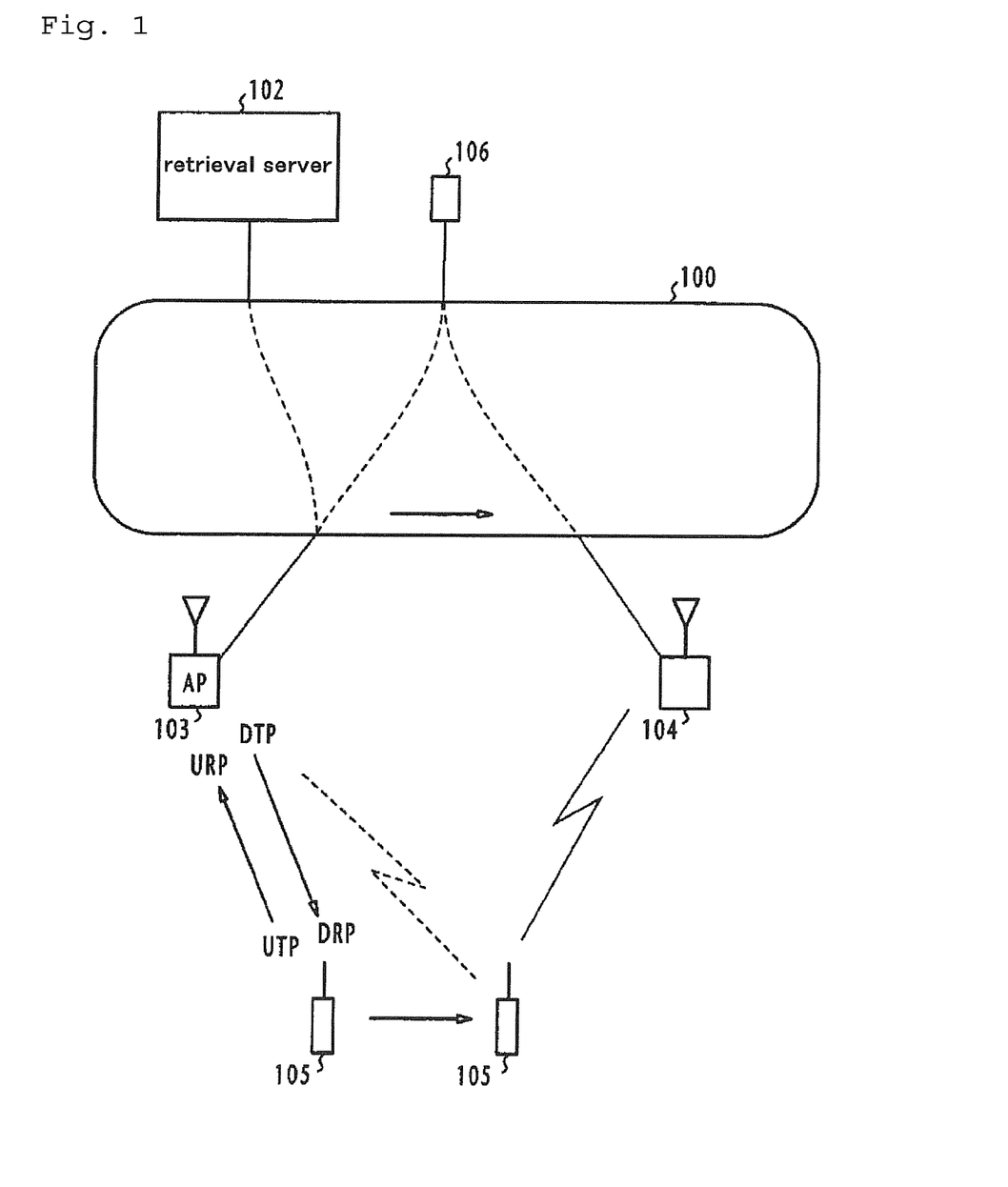
FIG. 1 is a conceptional view of the mobile wireless communication system in accordance with the first exemplary embodiment of the present invention.

FIG. 1 is a conceptional view of the mobile wireless communication system in accordance with the first exemplary embodiment of the present invention.

The mobile wireless communication system in accordance with the first exemplary embodiment is comprised of a network 100, a retrieval server 102 capable of making wireless communication through the network 100, a plurality of wireless stations each capable of making wireless communication through the network 100 (only a first wireless station 103 and a second wireless station 104 are illustrated in FIG. 1), and a mobile communication terminal device 105 making wireless communication, keeping a first wireless link comprising a pair of uplink and downlink with one of the wireless stations.

The network 100 is comprised of Internet, for instance.

The retrieval server 102 includes a database indicating a location of each of the wireless stations. On receipt of a retrieval request from the mobile communication terminal device 105, the retrieval server 102 retrieves the database to identify a wireless station located in the vicinity of the mobile communication terminal device 105 in accordance with both a location of the mobile communication terminal device 105 and a direction in which the mobile communication terminal device 105 moves.

Each of the first wireless station 103 and the second wireless station 104 is comprised of a WLAN access point or a mobile communication network base station. In the first exemplary embodiment, the first wireless station 103 is comprised of a WLAN access point, and the second wireless station 104 is comprised of a WLAN access point or a mobile communication network base station.

The mobile communication terminal device 105 is comprised of a mobile phone, for instance.

FIG. 1 illustrates that the mobile communication terminal device 105 establishes wireless link with the first wireless station 103, is making wireless communication with a communication terminal device 106 through the network 100, and starts moving in a direction A during the communication, approaching the second wireless station 104.

Figure 2:
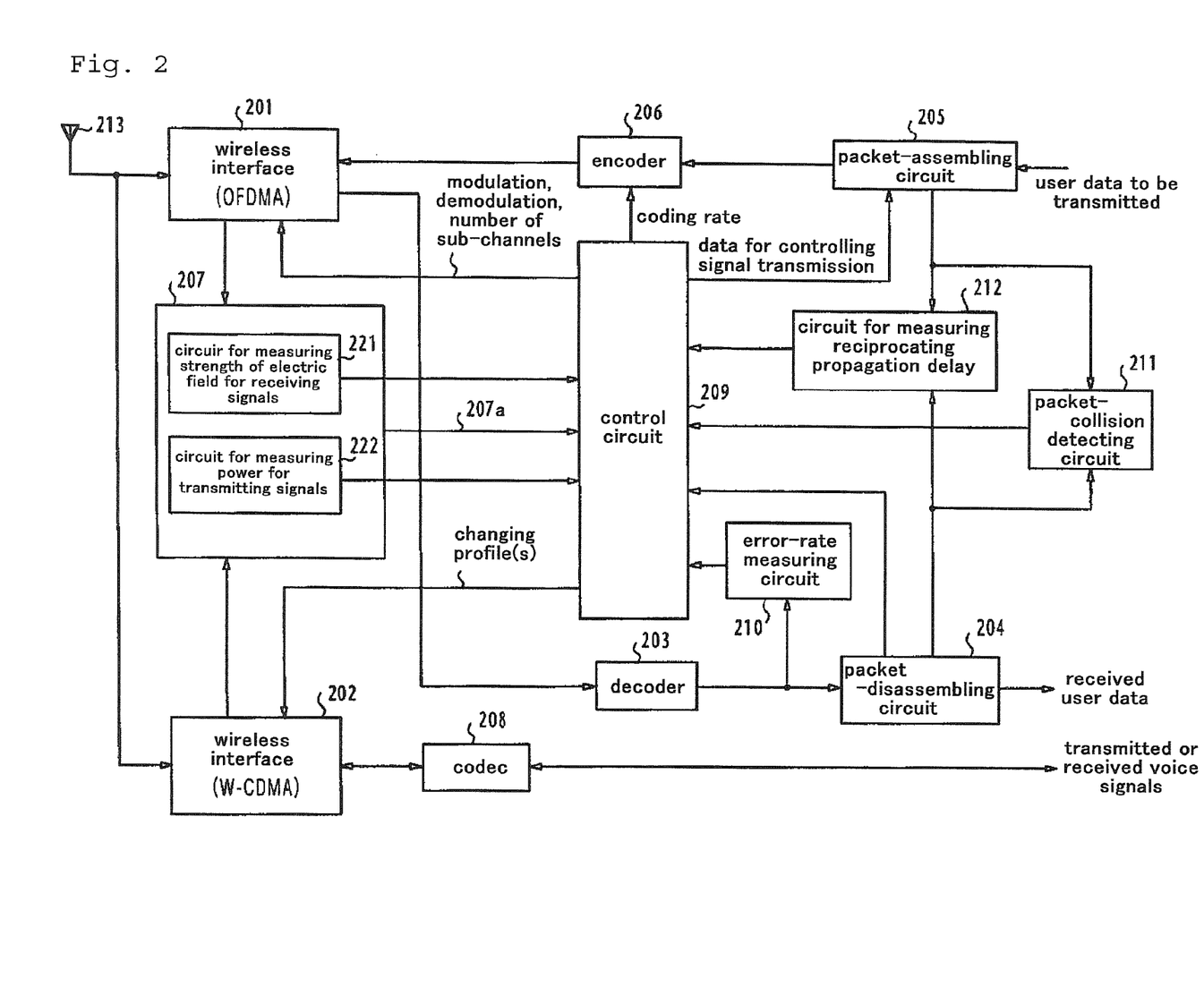
FIG. 2 is a block diagram illustrating a structure of the mobile communication terminal device used in the mobile wireless communication system in accordance with the first exemplary embodiment of the present invention.

FIG. 2 is a block diagram of the mobile communication terminal device 105 in the first exemplary embodiment.

As illustrated in FIG. 2, the mobile communication terminal device 105 includes an OFDMA (Orthogonal Frequency Division Multiple Access) wireless interface 201, a W-CDMA (Wideband Code Division Multiple Access) wireless interface 202, a decoder 203, a circuit 204 for disassembling packets, a packet 205 for assembling packets, an encoder 206, a measuring circuit 207, a codec 208, a control circuit 209, a circuit 210 for measuring an error rate, a circuit 211 for detecting packet collision, a circuit 212 for measuring reciprocating propagation delay, and an antenna 213.

The OFDMA wireless interface 201 establishes a plurality of sub-channels with a wireless station comprised of a WLAN access point.

The W-CDMA wireless interface 202 establishes a spread spectrum channel with a wireless station comprised of a mobile communication network base station.

The mobile communication terminal device 105 and the communication terminal device 106 transmit signals to and receive signals from each other through the codec 208 and the W-CDMA wireless interface 202.

Signals having been received at the OFDMA wireless interface 201 through the antenna 213 are decoded in the decode 203, and then, converted into original digital signals in the packet-disassembling circuit 204.

User data to be transmitted are assembled into packets in the packet-assembling circuit 205, encoded in the encoder 206, and then, transmitted through the OFDMA wireless interface 201 and the antenna 213.

Figure 3:
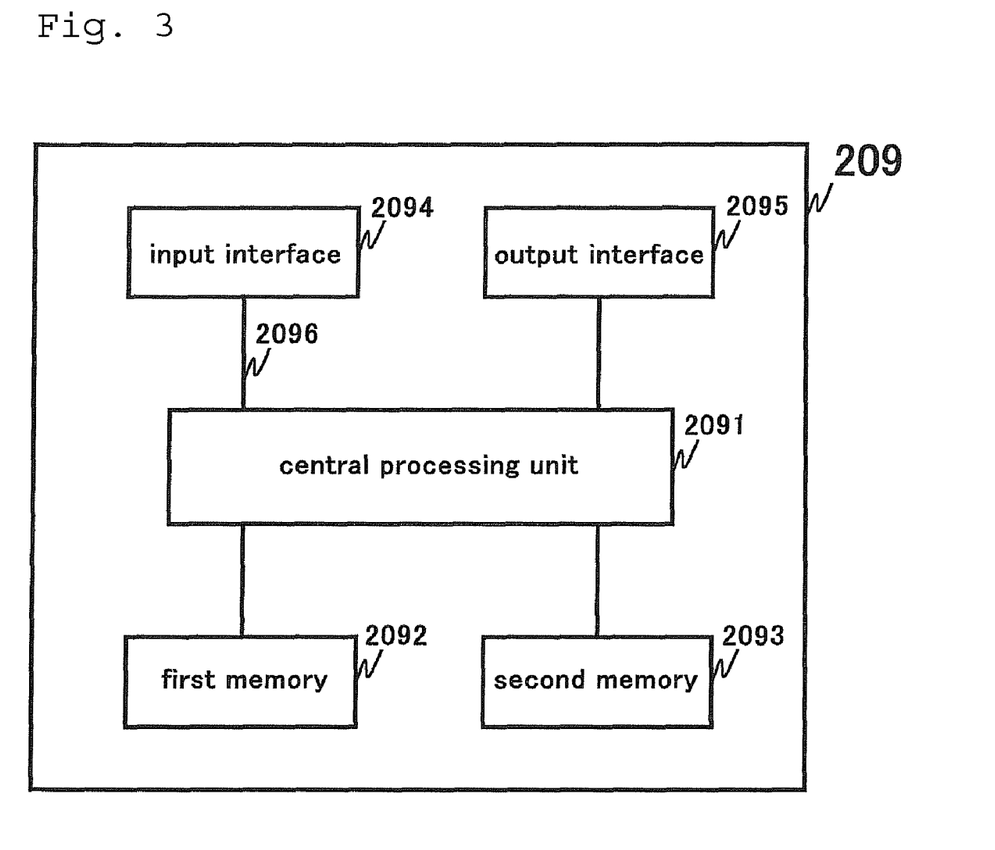
FIG. 3 is a block diagram showing an example of a control circuit mounted in the mobile communication terminal device used in the mobile wireless communication system in accordance with the first exemplary embodiment of the present invention.

FIG. 3 is a block diagram of an exemplary structure of the control circuit 209.

The control circuit 209 is comprised of a central processing unit (CPU) 2091, a first memory 2092, a second memory 2093, an input interface 2094 through which a command and/or data is input into the central processing unit 2091, an output interface 2095 through which a result of steps having been executed by the central processing unit 2091 is output, and buses 2096 through which the central processing unit 2091 is electrically connected with the other parts.

Each of the first and second memories 2092 and 2093 is comprised of a semiconductor memory such as a read only memory (ROM), a random access memory (RAM) or an IC memory card, or a storage device such as a flexible disc, a hard disc or an optic magnetic disc. In the present exemplary embodiment, the first memory 2092 comprises a ROM, and the second memory 2093 comprises a RAM.

The first memory 2092 stores therein fixed data such as a program to be executed by the central processing unit 2091. The second memory 2093 stores therein various data and parameters, and provides an area for the central processing unit 2091 to operate therein. That is, the second memory 2093 stores data therein temporarily necessary for the central processing unit 2091 to execute the program.

The central processing unit 2091 reads the program out of the first memory 2092, and executes the program. In other words, the central processing unit 2091 operates in accordance with the program stored in the first memory 2092.

The measuring circuit 207 is comprised of a circuit 221 for measuring a strength of an electric field for receiving signals, and a circuit 222 for measuring a power for transmitting signals. The measuring circuit 207 is connected to the OFDMA wireless interface 201 and the W-CDMA wireless interface 202. The circuit 221 measures a strength of an electric field for receiving signals, and transmits a signal indicative of the measured strength, to the control circuit 209. The circuit 222 measures a power for transmitting signals in the mobile communication terminal device 105, and transmits a signal indicative of the measured power to the control circuit 209.

The error-rate measuring circuit 210 is connected to an output of the decoder 203. The error-rate measuring circuit 210 measures an error rate in signals having been received in the OFDMA wireless interface 201, and transmits the measures error rate to the control circuit 209.

The control circuit 209 judges quality of a wireless link established between the mobile communication terminal device 105 and the first wireless station 103, based on a strength of an electric field for receiving signals, received from the circuit 221, a power for transmitting signals, received from the circuit 222, and an error rate received from the error-rate measuring circuit 210.

For instance, if signals transmitted from the first wireless station (access point) 103 can readily reach the mobile communication terminal device 105, and signals transmitted from the mobile communication terminal device 105 can readily reach the first wireless station (access point) 103, the control circuit 209 judges that a wireless link established between the mobile communication terminal device 105 and the first wireless station 103 has high quality.

The control circuit 209 varies profiles in the mobile communication terminal device 105 for transmitting signals, in accordance with the judgment results, as mentioned later.

When a strength of an electric field for receiving signals is equal to or smaller than a predetermined strength, the control circuit 209 transmits a retrieval request packet to the retrieval server 102 through the packet-assembling circuit 205, the encoder 206, the OFDMA wireless interface 201, and the antenna 213.

The control circuit 209 simultaneously determines modulation, a number of sub-channels, and a coding rate in uplink in accordance with the above-mentioned three measurements for reestablishing the OFDMA wireless interface 201 and the encoder 206, and transmits the thus determined operational profiles in uplink to the first wireless station 103 as control packets (a request for changing profiles) through the packet-assembling circuit 205.

On receipt of the control packets from the mobile communication terminal device 105, the first wireless station 103 determines modulation, a number of sub-channels, and a coding rate in downlink in accordance with the above-mentioned three measurements having been measured by the first wireless station 103, and changes current modulation, a current number of sub-channels, and a current coding rate into the thus determined modulation, number and rate, and further, notifies the mobile communication terminal device 105 of the thus determined operational profiles in downlink.

Signals indicative of the operational profiles in downlink transmitted to the mobile communication terminal device 105 from the first wireless station 103 are converted in the packet-disassembling circuit 204 into control data used for controlling receiving signals, and then, transmitted to the control circuit 209. The control circuit 209 changes demodulation in the OFDMA wireless interface 201, and a number of sub-channels in accordance with the received control data.

The circuit 211 detects collision of packets. The packet-collision detecting circuit 211 is connected to both the packet-assembling circuit 205 and the packet-disassembling circuit 204. The packet-collision detecting circuit 211 counts a number by which packets having been transmitted from the mobile communication terminal device 105 collide with other packets on a transmission path, to thereby judge communication quality except the above-mentioned wireless link.

When communication traffic increases in a common area, the mobile communication terminal device 105 attempts to transmit data such that the data does not interfere with data transmitted from other mobile communication terminal devices. However, the greater a number of collision is, the lower estimate to communication quality in the area is.

The circuit 212 is connected to both the packet-assembling circuit 205 and the packet-disassembling circuit 204, and measures a reciprocating propagation time in which packets transmitted from the mobile communication terminal device 105 are received by the communication terminal device 106, and reply packets transmitted from the communication terminal device 106 reach the mobile communication terminal device 105.

The measured reciprocating propagation time is transmitted to the control circuit 209. The control circuit 209 judges quality of communication made between the mobile communication terminal device 105 and the communication terminal device 106, in accordance with how much degree the measured reciprocating propagation time delays in comparison with standard reciprocating propagation time.

Specifically, since a lot of routers exist between the first wireless station 103 and the communication terminal device 106, a period of time necessary for signals to arrive at the communication terminal device 106 from the mobile communication terminal device 105 varies in dependence on communication traffic passing through the routers. The control circuit 109 judges that the shorter the propagation delay time is, the higher communication quality on network between the mobile communication terminal device 105 and the communication terminal device 106 is, and vice versa.

The control circuit 209 further compares a number of packet collisions indicated in the signal transmitted from the circuit 211 to a predetermined number. If a number of packet collisions is equal to or greater than the predetermined number, the control circuit 209 transmits a retrieval request to the retrieval server 102.

The control circuit 209 further compares the reciprocating propagation time indicated in the signal transmitted from the circuit 212 to a predetermined time. If the reciprocating propagation time is equal to or greater than the predetermined time, the control circuit 209 transmits a retrieval request to the retrieval server 102.

The measuring circuit 207 monitors whether internal interference, which occurs between the OFDMA wireless interface 201 and the W-CDMA wireless interface 202 when both of them operate, occurs. If the measuring circuit 207 detects the internal interference, the measuring circuit 207 transmits a signal 207a indicative of the detection of the internal interference to the control circuit 209.

On receipt of the signal 207a indicative of the detection of the internal interference, the control circuit 209 varies wireless profiles of the W-CDMA wireless interface 202 to thereby stop the internal interference. It is possible to stop the internal interference by varying wireless profiles of the OFDMA wireless interface 201, if handover is not being carried out.

Figure 4:
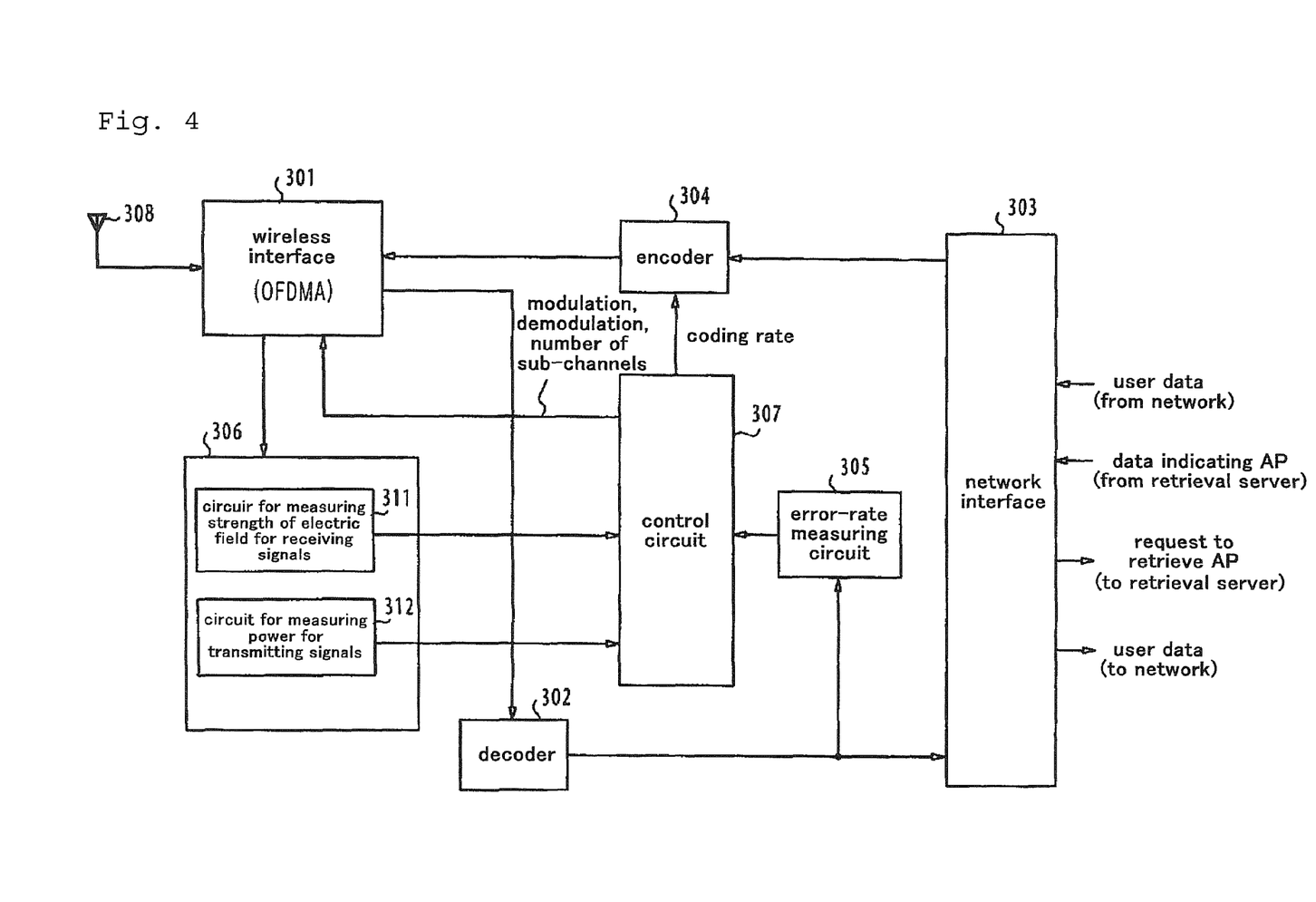
FIG. 4 is a block diagram illustrating a structure of the first wireless station used in the mobile wireless communication system in accordance with the first exemplary embodiment of the present invention.

FIG. 4 is a block diagram showing a structure of the first wireless station 103.

As illustrated in FIG. 4, the first wireless station 103 is comprised of an OFDMA wireless interface 301, a decoder 302, a network interface 303, an encoder 304, a circuit 305 for measuring an error rate, a measuring circuit 306, a control circuit 307, and an antenna 308.

Signals having been transmitted from the mobile communication terminal device 105 are received by the OFDMA wireless interface 301, input into the decoder 302, and decoded in the decoder 302.

The decoded signals are transmitted to the communication network 100 through the network interface 303, and then, transmitted to the communication terminal device 106 through the communication network 100.

Signals transmitted from the communication terminal device 106 are input into the network interface 303 through the communication network 100, and then, encoded in the encoder 304. Then, the signals are transmitted to the mobile communication terminal device 105 through the OFDMA wireless interface 301.

The error-rate measuring circuit 305 is connected to an output of the decoder 302. The error-rate measuring circuit 305 measures an error rate of signals having been transmitted from the mobile communication terminal device 105, and notifies the control circuit 307 of the measurement.

The measuring circuit 306 is comprised of a circuit 311 for measuring a strength of an electric field for receiving signals, and a circuit 312 for measuring a power for transmitting signals. The measuring circuit 306 is connected to the OFDMA wireless interface 301. The circuit 311 measures a strength of an electric field for receiving signals, and transmits a signal indicative of the measured strength, to the control circuit 307. The circuit 312 measures a power for transmitting signals in the first wireless station 103, and transmits a signal indicative of the measured power to the control circuit 307.

The control circuit 307 has the same structure as that of the control circuit 209 of the mobile communication terminal device 105 illustrated in FIG. 3. Specifically, a central processing unit in the control circuit 307 reads a program out of a first memory, and executes the program. That is, the central processing unit in the control circuit 307 operates in accordance with the program stored in the first memory.

On receipt of the retrieval request from the mobile communication terminal device 105, the control circuit 307 transmits a retrieval request packet to the retrieval server 102 through the network interface 303, and receives a reply thereof as data indicative of an access point (AP).

On receipt of a request to change a profile or profiles from the mobile communication terminal device 105, the control circuit 307 determines modulation, a number of sub-channels, and a coding rate in accordance with a strength of an electric field for receiving signals, a power for transmitting signals, and an error rate in received signals in the first wireless station 103, applies the determined modulation, number and rate to associated devices thereof, and notifies the mobile communication terminal device 105 of the determined modulation, number and rate.

Figure 5:
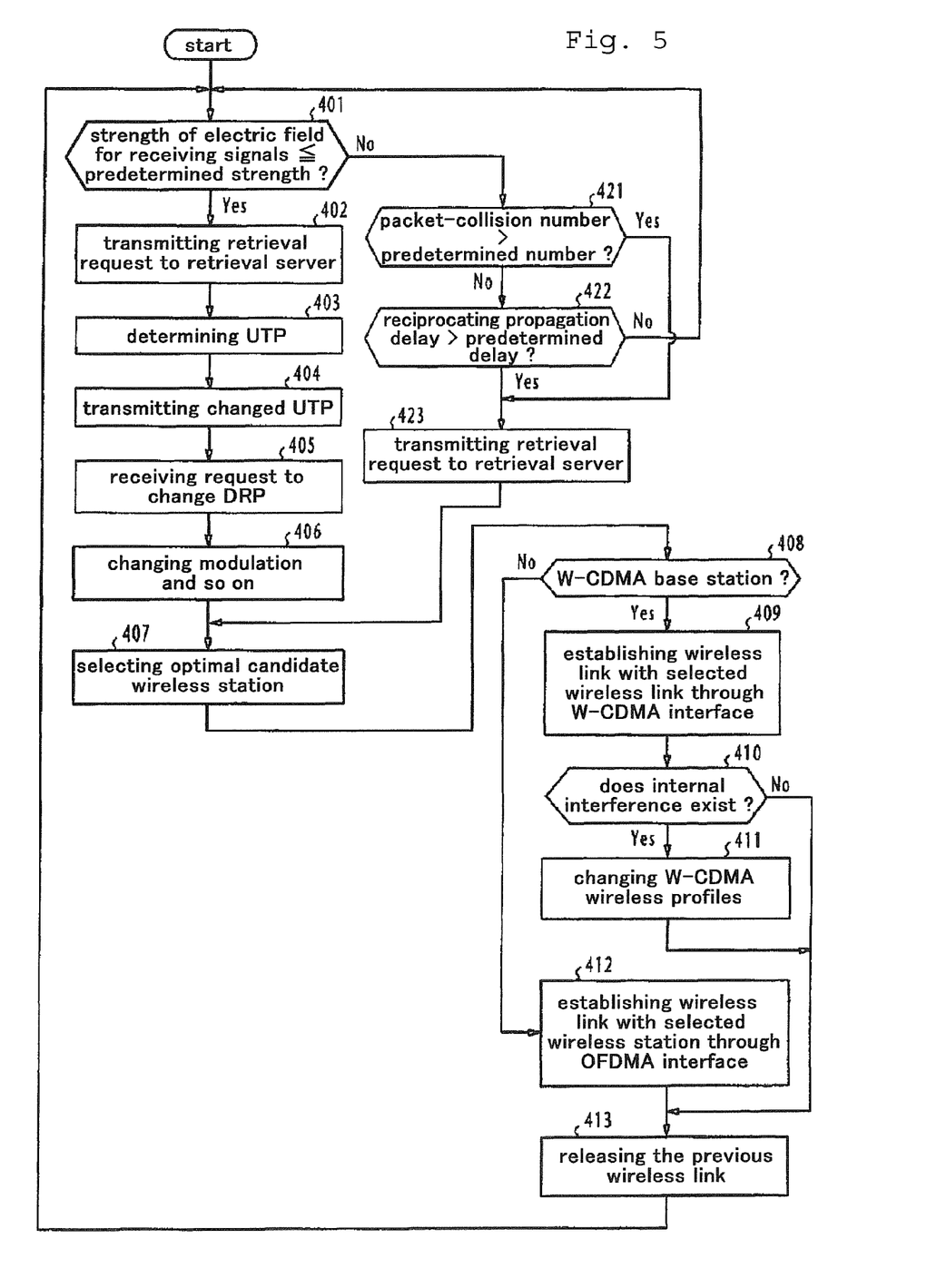
FIG. 5 is a flow-chart showing an operation of the control circuit mounted in the mobile communication terminal device used in the mobile wireless communication system in accordance with the first exemplary embodiment of the present invention.

FIG. 5 is a flow-chart showing an operation of the control circuit 209 of the mobile communication terminal device 105 in the mobile wireless communication system in accordance with the present exemplary embodiment.

The operation of the control circuit 209 of the mobile communication terminal device 105 in the present exemplary embodiment is explained hereinbelow with reference to FIG. 5.

It is supposed that the mobile communication terminal device 105 presently uses the OFDMA wireless interface 201, and has wireless link with the first wireless station 103 comprised of a WLAN access point.

First, the control circuit 209 judges whether a strength of an electric field in the signals having been transmitted from the first wireless station 103 is equal to or smaller than a predetermined strength (step 401).

If a strength of an electric field in the signals having been transmitted from the first wireless station 103 is equal to or smaller than a predetermined strength (YES in step 401), the control circuit 209 transmits a retrieval request packet to the retrieval server 102 (step 402).

Then, the control circuit 209 receives both a strength of an electric field for receiving signals in downlink and a power for transmitting signals in uplink from the measuring circuit 207, and further receives an error rate in downlink from the error-rate measuring circuit 210 to thereby determine profiles (UTP) (modulation, a number of sub-channels for transmitting signals, and a coding rate in uplink) for transmitting signals in uplink, which indicate a plurality of operational profiles in uplink in the mobile communication terminal device 105 (step 403).

Then, the control circuit 209, as a result of the uplink signal-transmission profiles (UTP) being changed, transmits how the uplink signal-transmission profiles (UTP) was changed by the mobile communication terminal device 105 to the first wireless station 103 as a message for requesting changing profiles (URP) for receiving signals in uplink in the first wireless station 103 (step 404).

Then, the control circuit 209 receives a message for requesting changing downlink signal-receipt profiles (DRP) from the first wireless station 103 (step 405).

Then, the control circuit 209 changes modulation, demodulation, a number of sub-channels for transmitting signals, a number of sub-channels for receiving signals, and a coding rate in accordance with both the uplink signal-transmission profiles (UTP) having been determined before, and the downlink signal-receipt profiles (DRP) having been received from the first wireless station 103 (step 406).

It is possible for signals to reach as far as possible by changing the modulation.

Specifically, by changing 64QAM into modulation having a low modulation rate, such as 16QAM or 4PSK, a signal can reach remoter in modulation having a low modulation rate than in modulation having a high modulation rate, even if the signal is transmitted at the same signal-transmission power.

Furthermore, it is possible to enhance ability of correcting an error for readily reproducing data by changing a coding rate such that redundant data increases.

In addition, it is possible to increase a maximum distance by which a signal can reach, by reducing a number of sub-channels to thereby raise an energy density per a sub-channel.

Then, the control circuit 209 receives a list of candidates of wireless stations from the retrieval server 102, and selects the most optimal wireless station among them (step 407).

Thereafter, the control circuit 209 judges whether the selected wireless station is a base station for a mobile communication network (step 408). Specifically, the control circuit 209 judges whether the selected wireless station is a base station for a mobile communication network or a wireless access point.

If the selected wireless station is a wireless access point (NO in step 408), the control circuit 209 establishes wireless link with the newly selected wireless station through the OFDMA wireless interface 201 which the mobile communication terminal device 105 presently uses, and notifies the newly selected wireless station of an address of the communication terminal device 106 (step 412).

Then, the control circuit 209 releases the previously used wireless link (step 413).

Thereafter, the control circuit 209 repeatedly carries out step 401 and the subsequent steps.

If the selected wireless station is a base station for a mobile communication network (YES in step 408), the control circuit 209 establishes wireless link with the newly selected wireless station through the W-CDMA wireless interface 202, and notifies the newly selected wireless station of an address of the communication terminal device 106 (step 409).

Then, the control circuit 209 judges whether there exists internal interference between the OFDMA wireless interface 201 and the W-CDMA wireless interface 202, in accordance with the signal 207a received from the measuring circuit 207 (step 410).

If there exists no internal interference (NO in step 410), the control circuit 209 releases the previously used wireless link (step 413).

If there exists internal interference (YES in step 410), the control circuit 209 prevents internal interference by changing wireless profiles of the W-CDMA wireless interface 202 (step 411).

Then, the control circuit 209 releases the previously used wireless link (step 413).

Thereafter, the control circuit 209 repeatedly carries out step 401 and the subsequent steps.

If a strength of an electric field in the signals having been transmitted from the first wireless station 103 is greater than the predetermined strength (NO in step 401), the control circuit 209 judges whether a number of packet collisions indicated in a signal transmitted from the packet-collision detecting circuit 211 is greater than a predetermined number (step 421).

If a number of packet collisions is greater than the predetermined number (YES in step 421), the control circuit 209 transmits a retrieval request to the retrieval server 102 (step 423).

Thereafter, the control circuit 209 carries out step 407 and the subsequent steps to thereby newly select a wireless station, and establishes wireless link with the newly selected wireless station (steps 407-413).

If a number of packet collisions is equal to or smaller than the predetermined number (NO in step 421), the control circuit 209 judges whether t If the reciprocating propagation delay of packets is greater than the predetermined delay (YES in step 422), the control circuit 209 transmits a retrieval request to the retrieval server 102 (step 423).

If the reciprocating propagation delay of packets is equal to or smaller than the predetermined delay (NO in step 422), the control circuit 209 carries out again step 410 and the subsequent steps.

Figure 6:
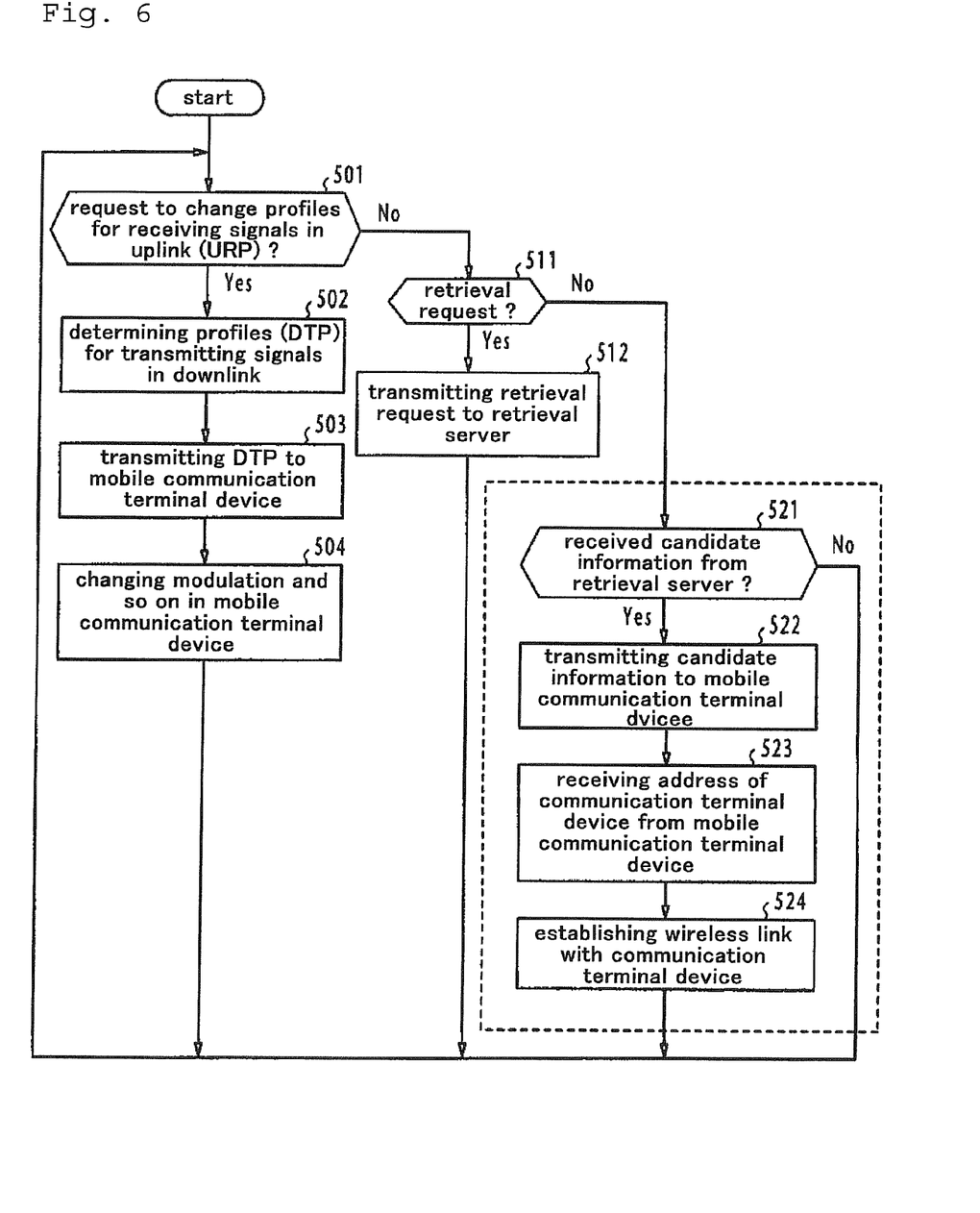
FIG. 6 is a flow-chart showing an operation of a control circuit equipped in the first wireless station used in the mobile wireless communication system in accordance with the first exemplary embodiment of the present invention.

FIG. 6 is a flow-chart showing an operation of the control circuit 307 equipped in the first wireless station 103.

The operation of the control circuit 307 equipped in the first wireless station 103 is explained hereinbelow with reference to FIG. 6.

The control circuit 307 equipped in the first wireless station 103 monitors whether the message (step 404 in FIG. 5) requesting changing a profile (URP) for receiving signals in uplink is received from the mobile communication terminal device 105 (step 501).

If the message for requesting changing a profile (URP) for receiving signals in uplink is received from the mobile communication terminal device 105 (YES in step 501), the control circuit 307 receives both a strength of an electric field for receiving signals in uplink and a power for transmitting signals in downlink from the circuits 311 and 312 of the measuring circuit 306, respectively, and further receives an error rate in uplink from the error-rate measuring circuit 305. Then, the control circuit 307 determines profiles (DTP) (modulation, a number of sub-channels for transmitting signals, and a coding rate) for transmitting signals in downlink in accordance with the above-mentioned strength, power and error rate (step 502).

Then, the control circuit 307 transmits the profiles (DTP) for transmitting signals in downlink to the mobile communication terminal device 105 as a request for changing profiles (DRP) for receiving signals in downlink (step 503).

Then, the control circuit 307 changes modulation, demodulation, a number of sub-channels for transmitting signals, a number of sub-channels for receiving signals, and a coding rate in uplink in accordance with both the profiles (URP) for receiving signals in uplink received from the mobile communication terminal device 105, and the profiles (DTP) for transmitting signals in downlink (step 504).

Thereafter, the control circuit 307 repeatedly carries out step 501 and the subsequent steps.

If the message for requesting changing a profile (URP) for receiving signals in uplink is not received from the mobile communication terminal device 105 (NO in step 501), the control circuit 307 judges whether the retrieval request is received from the mobile communication terminal device 105 (step 511).

If the retrieval request is received from the mobile communication terminal device 105 (YES in step 511), the control circuit 307 transmits the received retrieval request to the retrieval server 102 (step 512).

Thereafter, the control circuit 307 repeatedly carries out step 501 and the subsequent steps.

Supposing that a certain wireless station has received a list of wireless station candidates from the retrieval server 102, the wireless station is the second wireless station 104 which is comprised of a wireless access point or a base station for a mobile wireless network and to which handover is directed. This means that the first wireless station 103 does not receive a retrieval request from the mobile communication terminal device 105 (NO in step 511).

Thus, the later-mentioned steps 521 to 524 (surrounded with a broken line) are carried out by the second wireless station 104.

The second wireless station 104 judges whether a list of wireless station candidates is received from the retrieval server 102 (step 521).

If a list of wireless station candidates is received from the retrieval server 102 (YES in step 521), the second wireless station 104 establishes wireless link with the mobile communication terminal device 105, and transmits the list to the mobile communication terminal device 105.

The second wireless station 104 receives an address of the communication terminal device 106 from the mobile communication terminal device 105 (step 523).

Then, the second wireless station 104 establishes wireless link with the communication terminal device 106 through the network 100 in accordance with the received address (step 524).

Thereafter, the control circuit 307 repeatedly carries out step 501 and the subsequent steps.

As explained above, the mobile communication terminal device 105 in the mobile wireless communication system in accordance with the present exemplary embodiment, if a strength of an electric field therein for receiving signals is equal to or smaller than a predetermined strength, changes profiles for transmitting signals in accordance with a plurality of operational parameters in order to maintain wireless link with the first wireless station 103 as long as possible, and notifies the first wireless station 103 of the changed profiles.

Before changing the profiles, the mobile communication terminal device 105 transmits a retrieval request to the retrieval server 102 through the first wireless station 103 to request the retrieval server 102 to find another wireless station.

The retrieval server 102 retrieves a database to select a wireless station as the second wireless station 104 in accordance with a current location of the mobile communication terminal device 105, and notifies the mobile communication terminal device 105 of an identification number of the selected wireless station through the first wireless station 103.

On receipt of the notification, the mobile communication terminal device 105 starts carrying out handover, establishes wireless link with the second wireless station 104, and notifies the second wireless station 104 of an address of the communication terminal device 106.

Receiving the notification, the second wireless station 104 establishes wireless link with the communication terminal device 106 through the network 100. Thus, the handover is achieved to the second wireless station 104 from the first wireless station 103.

The mobile communication terminal device 105 in the mobile wireless communication system in accordance with the present exemplary embodiment maintains wireless link through which the mobile communication terminal device 105 is presently making wireless communication with the first wireless station 103, until the mobile communication terminal device 105 newly establishes wireless link with the second wireless station 104 to which handover is directed. Thus, continuity in communication is ensured as long as possible after a strength of an electric field for receiving signals in downlink has fallen below a predetermined strength, resulting in stable quality in wireless link. That is, the handover is carried out without interruption in communication.

INDUSTRIAL APPLICABILITY

The present invention presents handover technique suitable to a system for combining mobile communication and IP (internet protocol) with each other.

Furthermore, the present invention uses both an OFDMA wireless interface and a W-CDMA wireless interface to make it possible to carry out handover over systems different from each other. For instance, the present invention can be applied to handover to be carried out between WLAN and W-CDMA, and further between WiMAX, Bluetooth, iBurst or wireless USB and a conventional cellular system.

The exemplary advantages obtained by the above-mentioned exemplary embodiments are described hereinbelow.

In the mobile wireless communication system in accordance with the present invention, the mobile communication terminal device maintains wireless link with a wireless station through which the mobile communication terminal device is presently making wireless communication, by changing a profile or profiles for transmitting or receiving wireless signals, until the mobile communication terminal device newly establishes wireless link with a wireless station to which handover is directed. Thus, it is possible to ensure continuity in communication as long as possible after a strength of an electric field for receiving wireless signals in downlink has been equal to or smaller than a predetermined threshold, and hence, keep quality of the wireless link stable. That is, it is possible to guarantee carrying out handover without interruption.

While the present invention has been described in connection with certain exemplary embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The invention claimed is:

1. A mobile wireless communication system comprising:
a network;
a retrieval server connected in wireless communication to said network;
a plurality of wireless stations connected in wireless communication to said network; and
a mobile communication terminal device making communication, keeping a first wireless link comprising a pair of uplink and downlink with one of said wireless stations,
wherein when a strength of an electric field for receiving wireless signal in said downlink is equal to or smaller than a predetermined strength, said mobile communication terminal device transmits a retrieval request to said retrieval server through a wireless station through which said mobile communication terminal device is making wireless communication, to cause said retrieval server to start selecting a new wireless station, changes at least one of profiles (UTP) for transmitting a wireless signal in said uplink, and notifies said wireless station of the changed profile(s),
said wireless station changes a profile or profiles (URP) for receiving wireless signal in uplink, corresponding to the changed profile(s) (UTP) for transmitting wireless signal in said uplink, received from said mobile communication terminal device, changes at least one of profiles (DTP) for transmitting wireless signal in said downlink, and notifies said mobile communication terminal device of the changed profile(s) (DTP) for transmitting wireless signal in said downlink,
said mobile communication terminal device, until said mobile communication terminal device establishes a second wireless link with said new wireless station notified from said retrieval server, changes a profile or profiles (DRP) for receiving wireless signal in downlink, corresponding to the changed profile(s) for transmitting wireless signal in said downlink, received from said wireless station, to maintain said first wireless link with said wireless station.

2. The mobile wireless communication system as set forth in claim 1, wherein said wireless station is comprised of an access point having a WLAN (Wireless Local Area Network) function.

3. The mobile wireless communication system as set forth in claim 1, wherein said mobile communication terminal device changes at least one of profiles (UTP) for transmitting wireless signal in said uplink, based on a strength of an electric field for receiving wireless signal, an electric power for transmitting wireless signal, and an error rate.

4. The mobile wireless communication system as set forth in claim 3, wherein at least one of profiles (UTP) for transmitting wireless signal in said uplink is modulation.

5. The mobile wireless communication system as set forth in claim 3, wherein at least one of profiles (UTP) for transmitting wireless signal in said uplink is a coding rate.

6. The mobile wireless communication system as set forth in claim 3, wherein said first wireless link is established in accordance with OFDMA (Orthogonal Frequency Division Multiple Access), and at least one of profiles (UTP) for transmitting wireless signal in said uplink is a number of subchannels in said OFDMA.

7. The mobile wireless communication as set forth in claim 3, wherein said wireless station, on receipt of notification that a profile or profiles for transmitting wireless signal in said uplink has(have) been changed, from said mobile communication terminal device, changes at least one of profiles (DTP) for transmitting wireless signal in said downlink, based on a strength of an electric field for receiving wireless signal, an electric power for transmitting wireless signal, and an error rate.

8. The mobile wireless communication system as set forth in claim 7, wherein at least one of profiles (DTP) for transmitting wireless signal in said downlink is modulation.

9. The mobile wireless communication system as set forth in claim 7, wherein at least one of profiles (DTP) for transmitting wireless signal in said downlink is a coding rate.

10. The mobile wireless communication system as set forth in claim 7, wherein at least one of profiles (DTP) for transmitting wireless signal in said downlink is a number of subchannels in said OFDMA.

11. The mobile wireless communication system as set forth in claim 1, wherein said mobile communication terminal device transmits said retrieval request to said retrieval server through said wireless station when a number of packet collisions exceeds a predetermined threshold.

12. The mobile wireless communication system as set forth in claim 1, wherein said mobile communication terminal device transmits said retrieval request to said retrieval server through said wireless station when propagation delay of packets exceeds a predetermined threshold.

13. The mobile wireless communication system as set forth in claim 1, wherein said mobile communication terminal device includes a plurality of wireless interfaces different from each other with respect to a communication system,
said mobile communication terminal device simultaneously establishes a plurality of wireless links with the plurality of wireless stations including said wireless station through which said mobile communication terminal device is making wireless communication, through said plurality of wireless interfaces, detects internal interference among said plurality of wireless interfaces, and cancels said internal interference by changing profiles for operating one of said plurality of wireless interfaces.

14. The mobile wireless communication system as set forth in claim 1, wherein said mobile communication terminal device is comprised of a mobile phone.

15. A method of carrying out handover in a mobile wireless communication system comprising: a network; a retrieval server connected in wireless communication to said network; a plurality of wireless stations connected in wireless communication to said network; and a mobile communication terminal device making communication, keeping a first wireless link comprising a pair of uplink and downlink with one of said wireless stations,
said method comprising:
a first step of, by said mobile communication terminal device, transmitting, when a strength of an electric field for receiving wireless signal in said downlink is equal to or smaller than a predetermined strength, a retrieval request to said retrieval server through a wireless station through which said mobile communication terminal device is making wireless communication, to cause said retrieval server to start selecting a new wireless station, changing at least one of profiles (UTP) for transmitting wireless signal in said uplink, and notifying said wireless station of the changed profile(s);

a second step of, by said wireless station, changing a profile or profiles (URP) for receiving wireless signal in uplink, corresponding to the changed profile(s) (UTP) for transmitting wireless signal in said uplink, received from said mobile communication terminal device, changing at least one of profiles (DTP) for transmitting wireless signal in said downlink, and notifying said mobile communication terminal device of the changed profile(s) (DTP) for transmitting wireless signal in said downlink;

a third step of, by said mobile communication terminal device, changing, until said mobile communication terminal device establishes a second wireless link with said new wireless station notified from said retrieval server, a profile or profiles (DRP) for receiving wireless signal in downlink, corresponding to the changed profile(s) (DTP) for transmitting wireless signal in said downlink, received from said wireless station, to maintain said first wireless link with said wireless station; and a fourth step of, by said mobile communication terminal device, establishing a second wireless link with said new wireless station notified from said retrieval server.

16. The method as set forth in claim 15, wherein said wireless station is comprised of an access point having a WLAN (Wireless Local Area Network) function.

17. The method as set forth in claim 15, wherein at least one of profiles (UTP) for transmitting wireless signal in said uplink is changed in said first step, based on a strength of an electric field for receiving wireless signal, an electric power for transmitting wireless signal, and an error rate.

18. The method as set forth in claim 17, wherein at least one of profiles (UTP) for transmitting wireless signal in said uplink is modulation.

19. The method as set forth in claim 17, wherein at least one of profiles (UTP) for transmitting wireless signal in said uplink is a coding rate.

20. The method as set forth in claim 17, wherein said first wireless link is established in accordance with OFDMA (Orthogonal Frequency Division Multiple Access), and at least one of profiles (UTP) for transmitting wireless signal in said uplink is a number of sub-channels in said OFDMA.

21. The method as set forth in claim 17, wherein said wireless station, on receipt of notification that a profile or profiles for transmitting wireless signal in said uplink has (have) been changed, from said mobile communication terminal device, changes in said second step at least one of profiles (DTP) for transmitting wireless signal in said downlink, based on a strength of an electric field for receiving wireless signal, an electric power for transmitting wireless signal, and an error rate.

22. The method as set forth in claim 21, wherein at least one of profiles (DTP) for transmitting wireless signal in said downlink is modulation.

23. The method as set forth in claim 21, wherein at least one of profiles (DTP) for transmitting wireless signal in said downlink is a coding rate.

24. The method as set forth in claim 21, wherein at least one of profiles (DTP) for transmitting wireless signal in said downlink is a number of sub-channels in said OFDMA.

25. The method as set forth in claim 15, wherein said mobile communication terminal device transmits said retrieval request to said retrieval server through said wireless station in said first step when a number of packet collisions exceeds a predetermined threshold.

26. The method as set forth in claim 15, wherein said mobile communication terminal device transmits said retrieval request to said retrieval server through said wireless station in said first step when propagation delay of packets exceeds a predetermined threshold.

27. The method as set forth in claim 15, wherein said mobile communication terminal device includes a plurality of wireless interfaces different from each other with respect to a communication system, said method further includes a step of, by said mobile communication terminal device, simultaneously establishing a plurality of wireless links with the plurality of wireless stations including said wireless station through which said mobile communication terminal device is making wireless communication, through said plurality of wireless interfaces, detecting internal interference among said plurality of wireless interfaces, and cancelling said internal interference by changing profiles for operating one of said plurality of wireless interfaces.

28. A wireless station to be used in a mobile wireless communication system comprising: a network; a retrieval server connected in wireless communication to said network; a plurality of wireless stations connected in wireless communication to said network; and a mobile communication terminal device making communication, keeping a first wireless link comprising a pair of uplink and downlink with one of said wireless stations, the wireless station comprising:

a first unit that receives, from said mobile communication terminal device, at least one of profiles (UTP) for said mobile communication terminal device transmitting wireless signal in said uplink, the at least one of the profiles being changed by said mobile communication terminal device when a strength of an electric field for receiving wireless signal in said downlink is equal to or smaller than a predetermined strength, said mobile communication terminal device transmits a retrieval request to said retrieval server through a wireless station through which said mobile communication terminal device is making wireless communication, to cause said retrieval server to start selecting a new wireless station, changes at least one of profiles (UTP) for transmitting wireless signal in said uplink; and a second unit that changes a profile or profiles (URP) for receiving wireless signal in uplink, corresponding to the changed profile(s) (UTP) for transmitting wireless signal in said uplink, received from said mobile communication terminal device, changes at least one of profiles (DTP) for transmitting wireless signal in said downlink, and notifies said mobile communication terminal device of the changed profile(s) (DTP) for transmitting wireless signal in said downlink.

29. The wireless station as set forth in claim 28, wherein said wireless station is comprised of an access point having a WLAN (Wireless Local Area Network) function.

30. The wireless station as set forth in claim 28, wherein the second unit changes, on receipt of notification that a profile or profiles for transmitting wireless signal in said uplink has (have) been changed, from said mobile communication terminal device, at least one of profiles (DTP) for transmitting wireless signal in said downlink, based on a strength of an electric field for receiving wireless signal, an electric power for transmitting wireless signal, and an error rate.

31. The wireless station as set forth in claim 30, wherein at least one of profiles (UTP) for transmitting wireless signal in said uplink is modulation.

32. The wireless station as set forth in claim 30, wherein at least one of profiles (UTP) for transmitting wireless signal in said uplink is a coding rate.

33. The wireless station as set forth in claim 30, wherein at least one of profiles (UTP) for transmitting wireless signal in said uplink is a number of sub-channels in said OFDMA.

34. A mobile communication terminal device in a mobile wireless communication system comprising: a network; a retrieval server connected in wireless communication to said network; a plurality of wireless stations connected in wireless communication to said network; and said mobile communication terminal device, said mobile communication terminal device making communication, keeping a first wireless link comprising a pair of uplink and downlink with one of said wireless stations, said mobile communication terminal device comprising:

a first unit that transmits, when a strength of an electric field for receiving wireless signal in said downlink is equal to or smaller than a predetermined strength, a retrieval request to said retrieval server through a wireless station through which said mobile communication terminal device is making wireless communication, to cause said retrieval server to start selecting a new wireless station, changes at least one of profiles (UTP) for transmitting wireless signal in said uplink, and notifies said wireless station of the changed profile(s);

a second unit that receives, when said wireless station changes a profile or profiles (URP) for receiving wireless signal in uplink, corresponding to the changed profile(s) (UTP) for transmitting wireless signal in said uplink, received from said mobile communication terminal device, and changes at least one of profiles (DTP) for transmitting wireless signal in said downlink, the changed profile(s) (DTP) for transmitting wireless signal in said downlink;

a third unit that changes, until said mobile communication terminal device establishes a second wireless link with said new wireless station notified from said retrieval server, a profile or profiles (DRP) for receiving wireless signal in downlink, corresponding to the changed profile(s) for transmitting wireless signal in said downlink, received from said wireless station, to maintain said first wireless link with said wireless station.

35. The mobile communication terminal device as set forth in claim 34, wherein the first unit changes at least one of profiles (UTP) for transmitting wireless signal in said uplink, based on a strength of an electric field for receiving wireless signal, an electric power for transmitting wireless signal, and an error rate.

36. The mobile communication terminal device as set forth in claim 35, wherein at least one of profiles (UTP) for transmitting wireless signal in said uplink is modulation.

37. The mobile communication terminal device as set forth in claim 35, wherein at least one of profiles (UTP) for transmitting wireless signal in said uplink is a coding rate.

38. The mobile communication terminal device as set forth in claim 34, wherein the first unit transmits said retrieval request to said retrieval server through said wireless station when a number of packet collisions exceeds a predetermined threshold.

39. The mobile communication terminal device as set forth in claim 34, wherein the first unit transmits said retrieval request to said retrieval server through said wireless station when propagation delay of packets exceeds a predetermined threshold.

40. The mobile communication terminal device as set forth in claim 34, including:

a plurality of wireless interfaces different from each other with respect to a communication system;

a unit that simultaneously establishes a plurality of wireless links with the plurality of wireless stations including said wireless station through which said mobile communication terminal device is making wireless communication, through said plurality of wireless interfaces, detects internal interference among said plurality of wireless interfaces, and cancels said internal interference by changing profiles for operating one of said plurality of wireless interfaces.

41. The mobile communication terminal device as set forth in claim 34, wherein said mobile communication terminal device is comprised of a mobile phone.

42. A non-transitory computer-readable storage medium storing therein a program for causing a computer mounted in a wireless station to carry out a method of carrying out handover in a mobile wireless communication system comprising: a network; a retrieval server connected in wireless communication to said network; a plurality of wireless stations connected in wireless communication to said network; and a mobile communication terminal device making communication, keeping a first wireless link comprising a pair of uplink and downlink with one of said wireless stations, wherein the program causes said computer to execute:

a step of receiving, from said mobile communication terminal device, at least one of profiles (UTP) for said mobile communication terminal device transmitting wireless signal in said uplink, the at least one of profiles being changed by said mobile communication terminal device when a strength of an electric field for receiving wireless signal in said downlink is equal to or smaller than a predetermined strength, and said mobile communication terminal device transmits a retrieval request to said retrieval server through a wireless station through which said mobile communication terminal device is making wireless communication, to cause said retrieval server to start selecting a new wireless station;

a step of changing a profile or profiles (URP) for receiving wireless signal in uplink, corresponding to the changed profile(s) (UTP) for transmitting wireless signal in said uplink, received from said mobile communication terminal device, changing at least one of profiles (DTP) for transmitting wireless signal in said downlink, and notifying said mobile communication terminal device of the changed profile(s) (DTP) for transmitting wireless signal in said downlink.

43. A non-transitory computer-readable storage medium storing therein a program for causing a computer mounted in a mobile communication terminal device to carry out a method of carrying out handover in a mobile wireless communication system comprising: a network; a retrieval server connected in wireless communication to said network; a plurality of wireless stations connected in wireless communication to said network; and a mobile communication terminal device making communication, keeping a first wireless link comprising a pair of uplink and downlink with one of said wireless stations, wherein the program causes said computer to execute:

a first step of transmitting, when a strength of an electric field for receiving wireless signal in said downlink is equal to or smaller than a predetermined strength, a retrieval request to said retrieval server through a wireless station through which said mobile communication terminal device is making wireless communication, to cause said retrieval server to start selecting a new wireless station, changing at least one of profiles (UTP) for transmitting wireless signal in said uplink, and notifying said wireless station of the changed profile(s);

a second step of receiving, when said wireless station changes a profile or profiles (URP) for receiving wireless signal in uplink, corresponding to the changed profile(s) (UTP) for transmitting wireless signal in said uplink, received from said mobile communication terminal device, and changes at least one of profiles (DTP) for transmitting wireless signal in said downlink the changed profile(s) (DTP) for transmitting wireless signal in said downlink;

a third step of changing a profile or profiles (DRP) for receiving wireless signal in downlink, corresponding to the changed profile(s) (DTP) for transmitting wireless signal in said downlink, received from said wireless station, to maintain said first wireless link with said wireless station; and a fourth step of establishing a second wireless link with said new wireless station notified from said retrieval server.

\* \* \* \* \*